United States Patent Office 3,380,870
Patented Apr. 30, 1968

3,380,870
METHOD OF HEAT SEALING POLYPROPYLENE
Hillard W. Pouncy, Jr., Somerset, N.J., assignor to Union Carbide Corporation, a corporation of New York
No Drawing. Filed Sept. 4, 1963, Ser. No. 306,603
6 Claims. (Cl. 156—308)

The present invention relates to heat sealable coated polypropylene film and methods for heat sealing said film. More particularly the present invention relates to biaxially oriented polypropylene film coated with a polyvinyl acetal which coating is not only heat sealable to itself but also to surface-treated polypropylene below the shrink temperature of such film.

Thin polypropylene films have a relatively low permeability to gases, vapors and liquids, and a relatively high degree of surface hardness, elasticity and abrasion resistance. Since these properties are highly desired in a packaging film, it would be expected that these films would gain immediate acceptance in the packaging industry. Such a film, however, has one serious drawback: It exhibits low mechanical properties, such as tear resistance and impact resistance. This deficiency has been overcome by monoaxially or biaxially stretching the film, thereby orienting it and improving these properties.

When such oriented film is heated to temperatures at or near the melting point however, it shrinks, causing distortion. This shrinkage has precluded the use of the ordinary methods of heat sealing or welding plastic film, as the fusion temperature of the film is above the shrink temperature. This results in unsightly puckering and distortion around the seal and weak areas which have become unoriented at and near the seal.

In accordance with the present invention it has been found that heat-sealable biaxially oriented polypropylene film can be prepared by conditioning the surface of said film to impart wettability to a liquid having a surface tension of from 38 to 56 dynes/centimeter, and coating said surface-conditioned film with a thin coating of a polyvinyl acetal having a softening point of from 49° to 97° C. While the thin coatings generally have a thickness of from 0.05 to 2 mils, it has been found desirable to use coatings having a thickness of from 0.1 to 0.4 mil. The coated films of this invention are clear and are readily heat sealed at temperatures well below the shrink temperatures of the film, to produce exceptionally strong seals.

Biaxially oriented polypropylene films are well known in the art as are the methods for preparing them and surface conditioning them. These films are generally made from polypropylene resins having a density of from 0.90 to 0.915 inclusive and a melt index of from 1 to 5 inclusive.

The film is biaxially oriented either during its manufacture or subsequent thereto by simultaneously stretching the film in either or both its longitudinal, or machine direction and its transverse direction. While the degree of stretch imparted to the film is generally determined by the use to which such film will be put, the film is usually stretched by a factor of from about 4 to about 6.

The oriented polypropylene film is then surface conditioned until it can be wet by a liquid having a surface tension of from 38 to 56 dynes/cm. Suitable surface conditioning means are well known to the art as means for imparting printability to polyolefin films. Illustrative of said surface conditioning means are electrostatic discharge, especially electrostatic corona discharge, flame treatment and oxidation by chemical agents such as chromic acid. All of these surface conditioning means can be used to impart wettability to the surface of polypropylene film, but electrostatic discharge treatment is preferred. This process generally comprises passing the polypropylene film between a high voltage potential discharge electrode and a ground rod. The voltage is adjusted to a sufficiently high level to discharge and preferably form a corona discharge about the film; the film is then drawn through the discharge arc gap at a rate sufficient to condition the surface until it can be wet by a liquid having a surface tension of from 38 to 56 dynes/cm. and preferably from 44 to 46 dynes/cm.

The electrostatic treatment of such film is described in U.S. Patent 3,018,189, issued on Jan. 23, 1962, to G. W. Traver and which is hereby incorporated by reference.

In the process of conditioning the surface of the film by flame treatment, the film is rapidly drawn through the flames of a gas burner which is disposed to the width of the film.

The chemical treatment comprises contacting the film with concentrated chromic acid solution by immersion. In each instance the film is treated until the desired wettability has been obtained. For the purposes of the present invention polypropylene film which has been treated by exposure to corona discharge is preferred.

While many liquids can be used to conveniently determine the wettability of the surface of polypropylene film, a particularly useful liquid system consists of formamide and 2-ethoxyethanol for lower surface tension ranges and formic acid and water for the higher ranges. Table A below indicates the composition of each mixture used to determine wettability and the surface tension of each.

TABLE A

| Formamide, Percent by Volume | 2-methoxyethanol, Percent | Surface Tension, dynes/cm. |
|---|---|---|
| 0 | 100.0 | 30 |
| 2.5 | 97.5 | 31 |
| 10.5 | 89.5 | 32 |
| 19.0 | 81.0 | 33 |
| 26.0 | 74.0 | 34 |
| 35.0 | 65.0 | 35 |
| 42.5 | 57.5 | 36 |
| 48.5 | 51.5 | 37 |
| 54.0 | 46.0 | 38 |
| 59.0 | 41.0 | 39 |
| 63.5 | 36.5 | 40 |
| 67.5 | 32.5 | 41 |
| 71.5 | 28.5 | 42 |
| 74.7 | 25.3 | 43 |
| 78.0 | 22.0 | 44 |
| 80.3 | 19.7 | 45 |
| 83.0 | 17.0 | 46 |
| 87.0 | 13.0 | 48 |
| 90.0 | 9.3 | 50 |
| 93.7 | 6.3 | 52 |
| 96.5 | 3.5 | 54 |
| 99.0 | 1.0 | 56 |

| Formic Acid, Percent by Volume | Water, Percent | Wetting Tension |
|---|---|---|
| 20 | 80 | 58 |
| 10 | 90 | 63 |
| 5 | 95 | 66 |
| 1 | 99 | 70 |
| 0 | 100 | 72 |

For the purposes of the present invention it is preferred to utilize lower acetals which contain from two to 6 carbon atoms inclusive in the acetal portion of the condensate. These aldehydes condense with polyvinyl alcohol through acetal formation of the aldehyde.

Illustrative of the structure of these condensates is

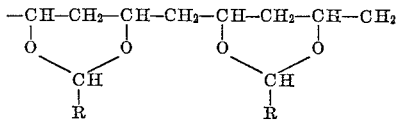

wherein R is an alkyl group of from 1 to 5 carbon atoms inclusive.

Illustrative of the aliphatic aldehydes which form acetal condensates with polyvinyl alcohols and which having softening points of from 49° to 97° C. are acetaldehyde, propionaldehyde, butyraldehyde, isobutyraldehyde, 2-ethylbutyraldehyde, and the like. Especially suitable as coating condensates in the present invention are polyvinyl acetal, polyvinyl propional, polyvinyl butyral, polyvinyl isobutyral, and polyvinyl 2-ethylbutyral. Preferred as a polyvinyl acetal coating is polyvinyl butyral as it exhibits a low softening point and high solubility in alcohols.

In the practice of this invention a polyvinyl acetal is coated on the polypropylene film by any convenient means. Illustrative of such means are melt extrusion coating and solution coating. Solution coating, because of its convenience, is the preferred method of application. In this method the polyvinyl acetal is dissolved in a suitable solvent such as a lower aliphatic alcohol, for example methanol, ethanol, propanol, butanol, and the like, and the solution is applied to the substrate by any convenient coating means such as roller coating, brush coating, dip coating, knife coating and the like. While the concentration of the polyvinyl acetal in the coating solution is not critical it has been found that solutions of from 1 to 20 percent by weight are convenient to coat.

The polyvinyl acetals employed in this invention are well known in the art, generally being prepared by reacting a normally solid polyvinyl alcohol with a lower aliphatic aldehyde.

The coated film is then dried by the evaporation of the solvent. The coating may be dried at room temperature or forced dried at elevated temperatures but below film shrink temperature. The polypropylene film having a dried coating of polyvinyl alcohol/condensate in its surface is conveniently heat sealed to either another coated surface or to a treated but uncoated polypropylene surface. For example, if the electrostatic discharge treated polypropylene film is coated only on one side then the film can be sealed by pinch contacting the end portion of the coated film or by overlapping the edges. The portions of the film to be sealed are held in intimate contact and raised to a temperature of from 93° C. to 129° C. and preferably at temperatures of from 120 to 123° C. This sealing is conveniently accomplished by utilizing a heat sealing device which clamps the film in intimate contact and heats the film contact portion by means of a heat sealing bar.

It has been found preferable to heat the film to a temperature of from 120 to 123° C. to effect the heat seal as this temperature produces heat seals of exceptional peel and shear strengths.

In the example that follows the seal strength was evaluated by cutting the various films into samples 4 to 6 inches wide and sealing by means of a bar type heat sealing apparatus. The specimens were cut into one inch samples and placed in an Instron testing machine. Each seal was evaluated for both peel strength and shear strength.

STANDARD TENSILE STRENGTH OF THE TACK SEALS

The tack seal strength was determined by tack sealing the specimens in 1 inch widths. Adjacent ends of the sealed films were mounted in the jaws of an "Instron" tensile tester having a cross head speed of 20 inches per minute to determine peel strength. The same procedure was followed in determining shear tensile strength except that opposite ends of the opposing films were placed in the jaws in order to exert shear. The readings from the scale of the tensile apparatus were recorded at point of delamination.

Example 1

One mil biaxially oriented polypropylene film treated by electrostatic corona discharge to be wetted by a liquid having a surface tension of 44–46 dynes/cm. was coated with a 9 percent solution of polyvinyl butyral in n-propanol by roller coating. The coated film was then dried to a coating thickness of about 0.2 mil.

In a similar manner untreated biaxially oriented polypropylene film was then heat sealed using a standard bar sealer, at various sealing bar temperatures. All of the heat seals were effected under a pressure of 20 p.s.i. Variations of seals produced were treated and coated to treated and coated polypropylene film; treated and coated to treated but uncoated polypropylene film; and treated and coated to untreated uncoated polypropylene film. The various seals effected were then evaluated in respect to peel and shear.

The results of these evaluations appear in Table I below:

TABLE I.—HEAT SEAL STRENGTH OF POLYVINYL BUTYRAL COATED [1] BIAXIALLY ORIENTED POLYPROPYLENE FILMS

| Temperature of Sealing Bar | | Surfaces Sealed [2] | Seal Strength (Grams) | |
|---|---|---|---|---|
| °C. | °F. | | Peel | Shear |
| 130 | (265) | C/C | 95 | 8,700 |
| 127 | (260) | C/C | 173 | 8,000 |
| 121 | (250) | C/C | 61 | 8,900 |
| 110 | (230) | C/C | 172 | 7,800 |
| 107 | (225) | C/C | 28 | 6,080 |
| 93 | (200) | C/C | 9 | 520 |
| 130 | (265) | C/T | 109 | 8,750 |
| 127 | (260) | C/T | 77 | 5,000 |
| 121 | (250) | C/T | 95 | 7,520 |
| 110 | (230) | C/T | 54 | 5,700 |
| 107 | (225) | C/T | 5 | 2,600 |
| 93 | (200) | C/T | 14 | 3,400 |
| 130 | (265) | C/UT | 5 | 1,360 |
| 121 | (250) | C/UT | 19 | 335 |
| 110 | (230) | C/UT | 0 | 73 |

[1] Coated from 9% n-propanol solution.
[2] C/C = Surfaces treated and coated.
C/T = One surface treated and coated and one surface treated only.
C/UT = One surface treated and coated and one surface untreated.

From the data of Table I above it can be clearly seen that biaxially oriented film can be easily sealed at temperatures below the shrink temperature of the film (about 270° F.). It can also be seen from this data that stronger seals can be obtained at lower temperatures when two coated and treated films are sealed than when only one film is coated. It is also indicated that stronger seals are produced in sealing single coated film to uncoated film when the uncoated film is treated to a sufficient level of wettability.

In a similar manner polyvinyl acetal, polyvinyl propional, polyvinyl isobutyral, can be used as suitable coating materials to impart heat sealability to biaxially oriented polypropylene film.

What is claimed is:

1. The method of heat sealing biaxially oriented polypropylene film the surface of which is wettable by a liquid having a surface tension of from 38 to 56 dynes/cm., which comprises (1) coating at least one surface of said polypropylene film with a solution of a polyvinyl acetal in a solvent for said polyvinyl acetal, wherein said polyvinyl acetal has a softening point of from 49° to 97° C. inclusive and wherein said coating has a dry thickness of from 0.1 to 0.4 mils, (2) drying said coating to remove said solvent and provide a coated surface, (3) contacting said coated surface with said polypropylene film and (4) heating the contacted surfaces to a temperature of from 93 to 129° C.

2. The method of claim 1 wherein the polyvinyl acetal is polyvinyl butyral.

3. The method of claim 2 wherein the solvent is n-propyl alcohol.

4. The method of claim 1 wherein a sheet of the coated polypropylene film is heat sealed at the coated side thereof to an uncoated sheet of said polypropylene film.

5. The method of claim 1 wherein two sheets of the coated polypropylene film are contacted at the coated surfaces thereof.

6. The method of claim 1 wherein the coated polypropylene film is heat sealed to itself through said coated surface.

(References on following page)

References Cited

UNITED STATES PATENTS

| | | | |
|---|---|---|---|
| 2,552,955 | 5/1951 | Gaiser et al. | 161—199 |
| 2,837,454 | 6/1958 | Watkins et al. | 161—199 |
| 2,997,170 | 8/1961 | Lowry et al. | 161—402 |
| 2,998,324 | 8/1961 | Hirt | 117—138.8 |
| 2,384,034 | 9/1945 | Johnson | 161—199 |
| 2,487,223 | 11/1949 | Cupery | 161—199 |
| 2,939,860 | 6/1960 | Schramm. | |
| 2,941,254 | 6/1960 | Swerlick | 117—138.8 |
| 3,018,189 | 1/1962 | Traver | 117—138.8 |
| 3,243,334 | 3/1966 | Lake. | |
| 3,262,808 | 7/1966 | Crooks et al. | 117—138.8 |

MORRIS SUSSMAN, *Primary Examiner.*